Feb. 18, 1947.            J. E. SWEARINGEN            2,415,973
                    CATALYTIC CONVERSION SYSTEM
                       Filed April 27, 1944
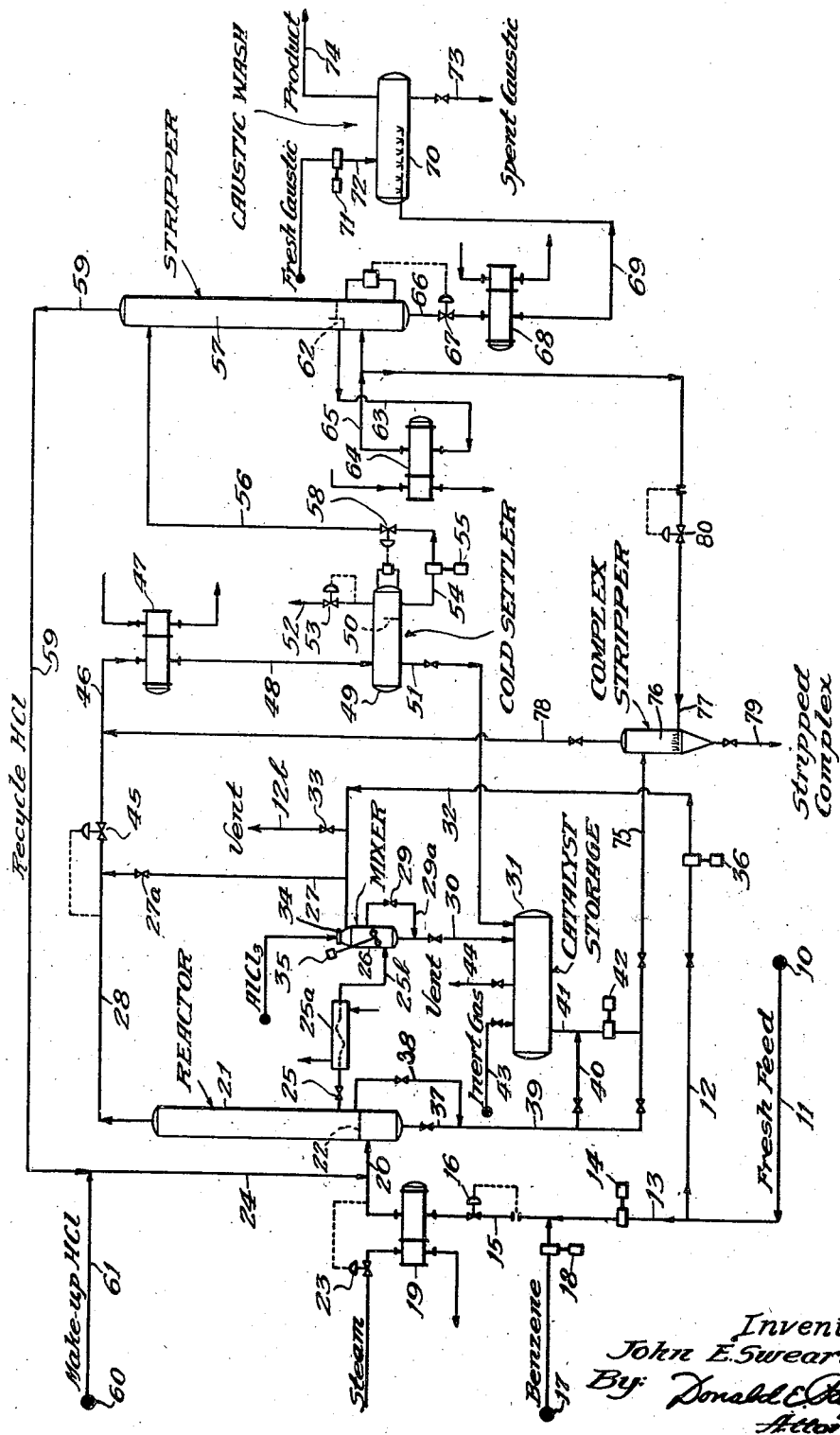
Inventor:
John E. Swearingen
By: Donald E. Payne
    Attorney Patented Feb. 18, 1947

2,415,973

UNITED STATES PATENT OFFICE 2,415,973

CATALYTIC CONVERSION SYSTEM

John E. Swearingen, Chicago, Ill., assignor to Standard Oil Company, Chicago, Ill., a corporation of Indiana Application April 27, 1944, Serial No. 532,954

6 Claims. (Cl. 260—683.5)

This invention relates to hydrocarbon conversion and hydrogen halide recovery and it pertains more particularly to an improved method and means for isomerizing light hydrocarbons such as normal butane, normal pentane, etc., by means of a liquid aluminum chloride-hydrocarbon complex promoted by hydrogen chloride.

An object of my invention is to provide a simplified commercial isomerization process and apparatus for isomerizing such hydrocarbons as pentane and butane and to minimize the construction and operating costs thereof. A particular object is to minimize hydrogen chloride losses and to decrease makeup hydrogen chloride requirements. A further object is to provide an improved method and means for supplying make-up catalyst to such a system, for handling catalyst in said system, and for recovering hydrogen chloride from catalyst leaving said system.

In hydrocarbon isomerization systems employing active metal halide catalyst there is a gradual accumulation of catalyst complex and this accumulation must be continuously or intermittently withdrawn from the conversion zone. It has been found that such complex contains appreciable amounts of hydrogen chloride which is loosely bound in the complex itself. The hydrolysis of such complex with water, steam or sulfuric acid is undesirable because of the expense involved, the corrosion problems, and the difficulties of handling the resulting sludge. It has been proposed that such spent or discarded complex be scrubbed or countercurrently contacted with incoming liquid charging stock in order to recover hydrogen chloride but tests have shown that by this method only about .1 mol of hydrogen chloride can be recovered per mol of aluminum chloride in the catalyst complex, about 1/7 the total amount available. An object of my invention is to provide a method and means whereby substantially all of the available hydrogen chloride may be recovered. A further object is to effect this recovery in simple and inexpensive apparatus and at minimum operating cost. A further object is to provide an improved and integrated isomerization and hydrogen chloride recovery system. Other objects will be apparent as the detailed description of my invention proceeds.

Since only about .1 mol of hydrogen chloride per mol of aluminum chloride can be recovered from spent aluminum chloride-hydrocarbon complex by stripping this complex with hot incoming liquid charging stock, it was most surprising to find that about 7 mol of hydrogen chloride per mol of aluminum chloride could be recovered from this same complex if the stripping were effected by a vaporized portion of the charging stock or product stream. This fact has, however, been verified by repeated tests and in accordance with my invention I obtain almost quantitative hydrogen chloride recovery from withdrawn complex by simply stripping it with charge or product vapors at a temperature within the approximate range of 200 to 400° F., preferably about 300 to 400° F., and a pressure sufficiently low to insure that the hydrocarbons employed for stripping are in vapor phase. By stripping withdrawn catalyst complex for about 4 to 8 hours at a temperature within the approximate range of 300 to 400° F., i. e. about 350° F. at a space velocity of about 1 to 1.5 volumes of charging stock (liquid basis) per hour per volume of spent catalyst, I can substantially reduce the "make-up" hydrogen chloride requirements.

Another feature of the invention is the effecting of this stripping by vapors already available in the system so that no additional heating means are required and so that the only additional equipment is a small stripping vessel, a few feet of pipe and a few additional valves. The vapors for effecting the stripping may be taken from the reboiler system at the base of the conventional product stripper. The gaseous products from the complex stripper may simply be returned to the effluent product stream at a point subsequent to the pressure reduction valve and prior to the pump which withdraws liquids from the base of the settler.

Another feature of the system includes preparation of make-up catalyst slurry or paste and the injection thereof into the reactor by the fluid pressure of the charging stock stream. Other features will become apparent from the following detailed description read in conjunction with the accompanying drawing which forms a part of this specification and which is a schematic flow diagram of my improved isomerization system.

In the drawing I have illustrated a commercial system for the isomerization of 1725 barrels per stream day of normal butane or normal pentane by means of a liquid aluminum chloride-hydrocarbon complex and added hydrogen chloride. In this system the charging stock from source 10 is introduced through the line 11, a small amount passes through line 12 for introducing make-up aluminum chloride but the bulk of the charging stock passes by line 13 to pump 14 which discharges it through line 15 at a rate regulated by flow-rate control 16. When a pentane charge is employed benzene may be added from source 17, by pump 18 to line 15. The charging stock then passes through preheater 19 which may be provided with about 800 square feet of heat exchange surface, and thence be discharged by line 20 to a low point in reactor 21 below distributor plate 22. The amount of steam introduced to preheater 19 may be regulated by controller 23. Recycled and make-up hydrogen chloride is introduced to line 20 through line 24.

Reactor 21 in this case is a vertical cylindrical vessel about 5 feet in diameter by about 40 feet in height designed to withstand operating pressures of at least 300 and preferably about 500 pounds per spuare inch and provided with a corrosion-resistant lining such as Hastelloy, suitable ceremic material, or glass cloth coated with a corrosion-resistant cement. Hastelloy is an iron-molybdenum-nickel alloy which is resistant to all concentrations of hot and cold sulfuric and hydrochloric acids; Hastelloy A for example contains 20% iron, 60% nickel and 20% molydbenum.

When fortification of the complex in the reactor 21 is desired, complex is withdrawn through valve 25, cooler 25a and line 25b to mixing vessel 26. Charging stock remaining in mixer 26 from the previous transfer of paste from the mixer to the reactor, will be displaced through line 27 and valve 27a into the reactor product line 28 by the incoming complex. Pressure equilibrium will be set up between complex in mixer 26 and reactor 21 and complex will rise in line 27 to the same height as complex in the reactor. Before adding make-up aluminum chloride, the pressure in mixing vessel 26 must be reduced to atmospheric and this pressure reduction is accomplished by first opening valve 29 in line 29a and allowing excess complex to drain through valved line 30 into catalyst storage drum 31. Since the catalyst storage drum will be maintained at about 30 pounds per square inch by inert gas pressure, the pressure in mixing drum 26 will be reduced to 30 pounds per square inch by the operation described above. Valve 29 is then closed and the complex in mixing drum 26 is vented to the blowdown stack through lines 27, 32, and valved line 33. The complex in mixer 26 will then be at atmospheric pressure and head 34 of mixing vessel 26 can be removed and solid aluminum chloride added. Conventionally 0.1 to 10, preferably 1 to 3, for instance 2 pounds of aluminum chloride are added per pound of complex contained in the mixing vessel. The head is replaced and mixer 35 is operated to produce a homogeneous paste in mixing vessel 26. Pump 36 is then started and fresh feed is pumped into vessel 26 through lines 12, 32 and 27 displacing the paste of aluminum chloride and complex through line 25b, cooler 25a (which will act as a heater for this service), valve 25, and into reactor 21. The succession of operations described above will be carried out intermittently and with such frequency as to maintain the desired catalyst activity in reactor 21.

Complex may be drained from the base of the reactor by line 37 or from a point above distributor plate by line 38 and introduced by lines 39, 40 and 41 into catalyst storage tank. Conversely catalyst may be withdrawn from the storage tank through line 41 and returned by pump 42 through lines 39 and 37 to the base of the reactor or through lines 39 and 38 to a point above the distributor plate 22. To provide for blanketing of catalyst complex in the storage tank an inert gas is introduced through line 43 and vented through line 44.

The effluent product stream which leaves the reactor through line 28 passes through pressure reducing valve 45 and thence through line 46 to after-cooler 47 which may require about 1100 square feet of heat exchange surface. The cooled products then pass through line 48 to cold settler 49 which may be a cylindrical vessel about 4 feet by 16 feet provided with overflow weir 50. Settled catalyst material may be returned from the base of the cold settler through valved line 51 to catalyst storage tank 31. Gases may be vented from the top of the settler through line 52 in amounts controlled by back pressure valve 53. In some cases it may be desirable to scrub hydrogen chloride out of gases thus removed from the top of the cold settler and in such cases we may countercurrently contact or scrub the effluent gases with a cool absorber oil such, for example, as a portion of the incoming charging stock or a portion of the cooled and caustic washed product stream. The scrubbing or absorber oil thus employed may either be combined with reactor charge or simply introduced into cold settler 49 depending on its composition.

The remaining liquid product stream consisting essentially of hydrocarbons and dissolved hydrogen chloride is withdrawn through line 54 and introduced by pump 55 and line 56 at an upper point in product stripper 57. Valve 58 may control the rate of flow in line 56 in accordance with the liquid level in cold settler 49.

The product stripper 57 may be a cylindrical vessel about 4 feet in diameter by about 55 feet high and it may be provided with about 20 trays. It should be designed to withstand an operating pressure higher than maximum desirable reactor pressure since the gases which leave the top thereof through line 59 are recycled directly through line 24 to reactor 21 without compression. Make-up hydrogen chloride is introduced from source 60 through line 61.

The stripper is provided at its base with trapout pan 62 from which liquids are withdrawn through line 63 to reboiler 64. Vapors are returned from this reboiler to the base of the stripper through line 65. Liquids are withdrawn from the base of stripper 57 through line 66 in amounts controlled by valve 67 in accordance with the liquid level in the base of stripper 57. The withdrawn liquid then passes through product cooler 68, thence through line 69 to caustic wash tank 70 into which caustic is introduced by pump 71 through line 72. Spent caustic is withdrawn through line 73 and the neutralized product stream is finally withdrawn through line 74 for water washing and/or fractionation.

The catalyst employed in this system is preferably an aluminum chloride-hydrocarbon complex which may be initially prepared (particularly in the case of pentane) by reaction of aluminum chloride with a portion of the charging stock in the presence of hydrogen chloride. For starting up the process, however, the complex may be prepared from other light saturated hydrocarbons such as a naphtha or kerosene, preferably with a branched-chain paraffinic hydrocarbon as described in U. S. Letters Patent 2,300,249. The hydrocarbons employed should be substantially free from olefins and aromatics. Such complex should have a heat of hydrolysis of about 300 to 400 calories per gram of complex and its hydrocarbon content should be at least about 15% but not more than about 40%.

After the system goes on stream complex is continuously produced by reaction of make-up aluminum chloride with a portion of the incoming charging stock and it is therefore necessary to withdraw catalyst complex from the system continuously or intermittently. Since about 1 to 20% or more by weight of hydrogen chloride (based on charging stock) is introduced into the reactor with the charging stock the catalyst complex withdrawn from the reactor contains appreciable amounts of hydrogen chloride. Thus while the atomic ratio of chlorine to aluminum in fresh complex prepared with commercial aluminum chloride may be of the order of about 2.72 the atomic ratio of chlorine to aluminum in complex withdrawn from the reactor after it has been on stream may be of the order of 3.36. I have found that the additional hydrogen chloride which has obviously been taken up by the complex cannot be recovered therefrom in any appreciable amounts by any scrubbing or countercurrent contacting with liquid incoming charging stock but that it can be recovered almost quantitatively by stripping withdrawn complex with charging stock or product vapors at a temperature within the approximate range of 200 to 400° F. preferably about 300 to 400° F., e. g. about 350° F. More specifically I have found that by thus contacting withdrawn complex with an amount of charging stock or product vapors amounting to less than 10% of the total charge or product we may reduce the atomic ratio of chlorine to aluminum in the complex from 3.36 to about 2.7, i. e. I may reduce the hydrogen chloride content to that present in the aluminum chloride used to make the complex. Since the operation of spent catalyst stripping is intermittent, the actual requirement is approximately one gallon of charging stock (or product) per daily barrel of reactor charge. The recovery of hydrogen chloride amounts to approximately .7 mol of hydrogen chloride per mol of aluminum chloride which is 5 to 10 times the recovery which could be effected by scrubbing the complex with liquid charging stock. I offer no explanation for the phenomenal effectiveness of stripping with charging stock or product vapors but its superiority over countercurrent scrubbing with liquid charge was unpredictable and very unexpected.

The complex withdrawn from the system may of course be stripped with a portion of the incoming charging stock provided that this charging stock is heated to a temperature of at least about 200° and preferably about 300° F. to 400° F. and employed in vapor phase in the stripping step. The amount of vapors required may vary throughout a considerable range depending on temperature, time of stripping, etc. When stripping during one 8 hour shift per day at about 350° F. I may employ about 1 to 10% by volume of the total charge or product stream, about 2% usually being sufficient but about 8% or about 130 to 140 barrels per day being employed in the specific example herein described. Where a sufficient amount of vapors are employed the stripping may be effected at temperatures as low as 100° F. but the viscosity of the complex usually makes such low temperature stripping undesirable. The stripping may be effected countercurrently and continuously, in which case the amount of vapors required may be very small, materially below 1% of stock charged or product produced. If the stripping with charging stock vapors is at sufficiently high pressure these vapors together with recovered hydrogen chloride may be introduced into the reactor through line 20. The preferred hydrogen chloride recovery system, however, is that illustrated in the drawing wherein the withdrawn complex is stripped by a portion of the product vapors leaving the top of the product stripper reboiler.

Complex withdrawn from storage tank 31 through line 41 and pump 42 or withdrawn directly from the reactor through lines 37 or 38 may be passed through lines 39 and 75 to complex stripper 76. This stripper may be a small cylindrical vessel about 2 feet in diameter by about 10 feet in height for the specific example shown and may be provided with a corrosion-resistant lining as in the case of the reactor. A small amount of the material from line 65 is introduced in the base of complex stripper 76 through line 77 and reducing valve 80. This reduction in pressure will result in a completely vaporized stripping medium. No pumps or compressors are required in either line 75 or line 77. The vapors which are introduced through line 77 and pass upwardly through complex stripper 76 leave the top of stripper 76 through line 78 and are conveyed thereby to line 46 for combination with the effluent product stream after this stream has passed through pressure reducing valve 45 and before it enters after cooler 47. The stripping in stripper 76 may be either continuous or batch-wise but if batch-wise a stripping time of several hours is usually required. The stripping time will of course be somewhat dependent upon the temperature and upon the rate at which stripping vapors are passed through the complex but in this case the stripping time should be within the approximate range of 1 to 8 hours at a temperature in the general vicinity of 300 to 400° F.

The stripped complex withdrawn through line 79 is liquid at stripping temperature but becomes highly viscous and stiff after cooling to room temperature, it can probably not be pumped at temperatures below about 150° F. Such spent complex may be hydrolyzed or otherwise treated or disposed of in any known manner, but the substantial freedom from hydrogen chloride greatly simplifies and facilitates such disposal.

As a specific example of my system for pentane isomerization, the catalyst may be prepared in storage tank 31 and introduced by pump 42 into reactor 21 to a level of about 20 or 25 feet. About 1725 barrels per day of pentane charging stock which is substantially free from olefins and which contains less than 10%, preferably less than 5% of hexanes and heavier hydrocarbons is pumped by pump 14 through preheater 19 to reactor 21 along with about 9 barrels per day of benzene from source 17. Generally speaking, the amount of benzene may range from about .1 to 2% by volume based on charging stock. Make-up aluminum chloride is introduced at the rate of about 1200 pounds per stream day.

The reactor may be operated at temperatures within the approximate range of 100 to 250° F. or more but it is preferably operated at about 150 to 200° F. under a pressure of the order of 200 to 500 pounds per square inch, for example about 300 pounds per square inch. The space velocity may be within the approximate range of .4 to 4 volumes of charging stock per volume of catalyst complex in the reactor per hour. Hydrogen chloride introduced through line 24 may amount to about 1 to 20% or more of the weight based on charging stock and, for example, may be about 5 to 10%. Without the use of my complex stripper 76 or equivalent means for recovering hydrogen chloride, the make-up hydrogen chloride requirements amounted to about 360 pounds per day. By virtue of my invention this requirement is reduced to about 100 pounds per day or even less.

After the charging stock has slowly passed upwardly through the reactor and complex has been settled in the upper part therefrom, the resulting product stream passes through pressure reducing valve 45 and is reduced to a pressure of about 120 pounds per square inch after which it is cooled in after-cooler 47 to about 100° F. Any methane or fixed gases may be vented from the system through line 52 and any entrained catalyst may be recycled through line 51, the product stream passing by pump 55 to stripper 57 which operates at a top temperature in this case of about 130° F., a bottom temperature of about 340° F., and a pressure of about 335 pounds per square inch. The stripped product is then cooled and caustic washed and about 1740 barrels per day are withdrawn through line 74 for fractionation, storage or blending.

Heat is supplied at the base of the stripper by reboiler 64 and the vapors which leave the top of the reboiler through line 65 may be at a temperature of about 350 to 400° F. Hot vapors from this line are withdrawn in small amounts, e. g. about 130 to 140 barrels per day or less, regulated by flow controller 80 to the base of complex stripper 76 which contains excess catalyst withdrawn from the reactor or storage tank. This excess catalyst results from the fresh additional complex in the reactor brought about by the addition of the approximate 1200 pounds per stream day of aluminum chloride. Since the pressures in reactor 21 and stripper 57 are both substantially in excess of the pressure in line 46, the stripping vapors from line 77 may be returned to the system without the necessity of pumps or compressors. As above stated, the stripping time may be of the order of 1 to 8 hours, preferably at least 4 hours, and the temperature should be of the order of 300 to 400° F. or in the general vicinity of 350° F. By this simple expedient enormous savings are effected in hydrogen chloride requirements.

When my system is employed for butane isomerization the general flow and reaction conditions may be substantially the same as in the case of pentane except that only about 135 pounds per stream day of make-up aluminum chloride is required and the make-up hydrogen chloride requirements are likewise materially decreased. In this case the product stripper 57 may operate at a bottom temperature of about 250° and a top temperature of about 150° F. and considerably less 275 pound steam is required for heating reboiler 64. The stripping of complex in stripper 76 will thus be less frequent in the case of butane than in the case of pentane because of the lesser amount of complex that must be disposed of. Here again, however, substantial savings may be effected in hydrogen chloride requirements.

My invention is also applicable to the recovery of hydrogen chloride from complex produced in the isomerization of light naphtha fractions, hexanes, heptanes, etc., but in the case the conversion is usually at higher pressures and is effected in the presence of added hydrogen. The charging stock or product vapors employed for stripping the withdrawn complex may be readily condensed and pumped as a liquid into the high pressure reactor or into the effluent product stream after the pressure thereon has been reduced.

While my invention has been described in connection with specific processes and specific catalysts it should be understood that the invention is applicable to any process wherein a spent active metal halide complex associated with substantial amounts of hydrogen halide must be withdrawn from a conversion system. Even in systems where aluminum chloride is supported on solid carriers there is usually a certain amount of hydrogen chloride-rich complex produced and hydrogen chloride may be recovered from such complex and returned to the system in the manner hereinabove described. Other modifications and applications of the invention and alternative operating conditions will be apparent to those skilled in the art from the above description.

I claim:

1. In an aluminum chloride conversion process wherein a hydrocarbon is contacted with an aluminum chloride catalyst in the presence of added hydrogen chloride to effect conversion of said hydrocarbons in a contacting zone and production of an aluminum chloride-hydrocarbon complex rich in hydrogen chloride, the improved method of operation which comprises withdrawing complex from said contacting zone and introducing it into a complex stripping zone, withdrawing an effluent product stream from said contacting zone and introducing it into a product stripping zone, withdrawing hydrocarbons from the base of said product stripping zone, heating the withdrawn hydrocarbons to obtain at least partial vaporization thereof and returning the major portion of said heated hydrocarbons to the base of said product stripping zone, introducing a small part of the heated hydrocarbons in vapor form at a low point in said complex stripping zone, stripping said complex with said vapors in said stripping zone and combining vapors from said complex stripping zone with said effluent product stream.

2. The method of claim 1 which includes the step of maintaining the complex stripping zone at a lower pressure than the pressure maintained in the contacting zone and the product stripping zone respectively, decreasing the pressure of the effluent product stream, combining vapors from said complex stripping zone with said effluent product stream after the pressure on said product stream has been reduced and subsequently pumping said product stream to said product stripping zone.

3. In apparatus for effecting hydrocarbon conversion a catalytic contacting chamber, a product stripping tower, a complex stripping tower, means for passing a hydrocarbon charging stock and hydrogen chloride through said contacting chamber in contact with an aluminum chloride catalyst whereby an aluminum chloride-hydrocarbon complex rich in hydrogen chloride is produced, means for introducing complex from said contacting chamber to said complex stripping tower, a product cooler, a product settler, means including a conduit and a pressure reducing valve for passing a product stream from said contacting chamber through said cooler to said settler, means including a pump for introducing product from the settler to said product stripping tower, means for returning gases from the top of said product stripping tower to said contacting chamber, a reboiler at the base of said product stripping tower, means for withdrawing liquid from the base of said product stripping tower to the reboiler and means for introducing vapors from said reboiler back to said product stripping tower, means for introducing vapors from the top of said reboiler to the base of said complex stripping tower, means for withdrawing stripped complex from said product stripping tower and means for introducing vapors from said complex stripping tower to the effluent product transfer means at a point subsequent to said pressure reducing valve.

4. In a process wherein an aluminum chloride-hydrocarbon complex rich in hydrogen chloride is produced in a conversion zone along with a hydrocarbon product containing dissolved hydrogen chloride, the method of recovering hydrogen chloride from said complex which comprises introducing said product into a stripping zone, reboiling product liquid at the base of said stripping zone, withdrawing complex from said conversion zone to a complex stripping zone and stripping said complex in said last-named zone with vapors from the reboiling step.

5. A pentane isomerization process which comprises passing a pentane charging stock along with a substantial amount of added hydrogen chloride upwardly through a column of aluminum chloride-hydrocarbon complex catalyst having a heat of hydrolysis within an approximate range of 300 to 400 calories per gram of complex while maintaining said column at a temperature within the approximate range of 100 to 250° F. and under a pressure within the range of 100 to 500 pounds per square inch at a space velocity within the approximate range of .4 to 4 volumes of charging stock per hour per volume of complex in the conversion zone, effecting said contacting in the presence of about .1 to 2% of added benzene, withdrawing a product stream from the upper part of said conversion zone, reducing the pressure on the withdrawn stream, cooling said stream, separating catalyst material from the cooled stream, then pumping said stream through a product stripping zone at a pressure slightly higher than the pressure of said conversion zone, reboiling liquids in the base of said stripping zone to supply heat to said zone for removing hydrogen chloride, returning removed hydrogen chloride to said conversion zone, withdrawing complex from said conversion zone to a complex stripping zone, introducing vapors from said reboiling step to a low point in said complex stripping zone and introducing vapors from the top of said complex stripping zone into the effluent product stream after the pressure on said stream has been reduced and before said stream has been returned to the product stripping zone.

6. In a hydrocarbon conversion process which results in the production of spent aluminum chloride catalyst material containing hydrogen chloride and a hydrocarbon product stream containing dissolved hydrogen chloride, the method of operation which comprises passing said product stream in liquid phase through a first stripping zone, heating said stream at the base of said first stripping zone to a temperature approximating the boiling point of hydrocarbons in said stream whereby hydrogen chloride is dispelled from said stream, introducing spent hydrogen chloride-containing catalyst material into a second stripping zone, maintaining the second stripping zone at a lower pressure than the first stripping zone, and passing hydrocarbon heated to approximately its boiling point from the base of the first stripping zone to the base of the second stripping zone with sufficient pressure reduction to insure substantially complete vaporization thereof when said hydrocarbon enters the second stripping zone.

JOHN E. SWEARINGEN.

REFERENCES CITED

The following references are of record in the file of this patent:

UNITED STATES PATENTS

| Number | Name | Date |
| --- | --- | --- |
| 2,314,297 | Watson | Mar. 16, 1943 |
| 2,339,685 | deSimo | Jan. 18, 1944 |
| 2,331,429 | Sensel | Oct. 12, 1943 |
| 1,608,328 | McAfee | Nov. 23, 1926 |
| 2,349,821 | Fragen | May 30, 1944 |
| 2,378,733 | Sensel | June 19, 1945 |
| 2,364,583 | deSimo et al. | Dec. 5, 1944 |
| 2,366,028 | Henry | Dec. 26, 1944 |
| 2,366,117 | Leonard | Dec. 26, 1944 |
| 2,378,734 | Kiersted | June 19, 1945 |
| 2,379,550 | Sutton | July 3, 1945 |